No. 776,334. PATENTED NOV. 29, 1904.
L. LACKNER.
HORSE BOOT.
APPLICATION FILED APR. 19, 1904.
NO MODEL. 2 SHEETS—SHEET 1.

Witnesses Inventor
Louis Lackner
By his Attorneys

No. 776,334. PATENTED NOV. 29, 1904.
L. LACKNER.
HORSE BOOT.
APPLICATION FILED APR. 19, 1904.
NO MODEL. 2 SHEETS—SHEET 2.
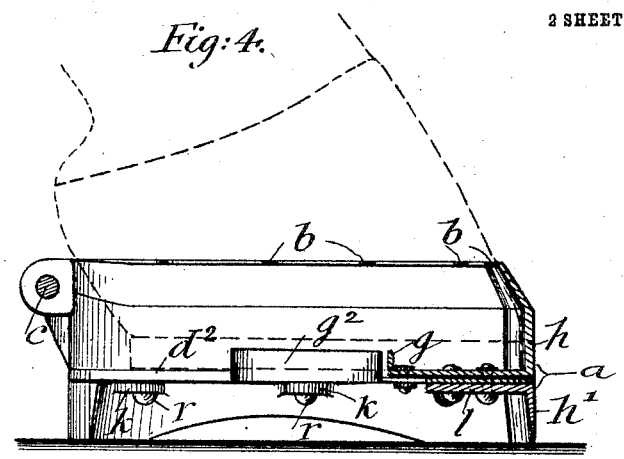
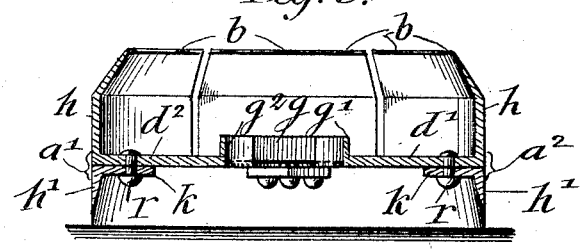
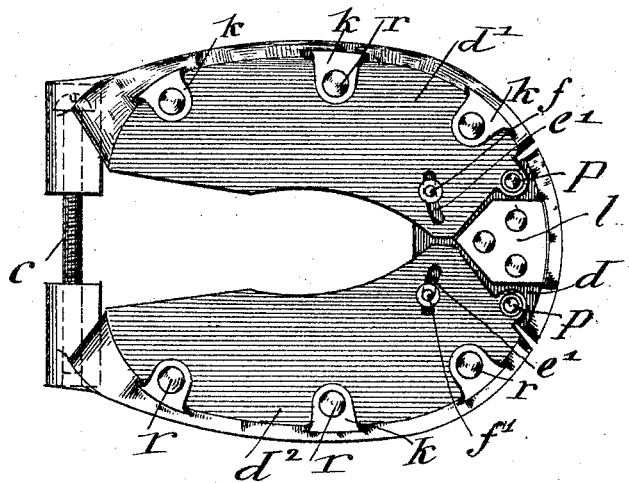
Witnesses
Inventor
Louis Lackner
By his Attorneys No. 776,334. Patented November 29, 1904.

UNITED STATES PATENT OFFICE.

LOUIS LACKNER, OF NEW YORK, N. Y., ASSIGNOR OF ONE-HALF TO FREDERICK C. DILTHEY, OF ROCKVILLE CENTER, NEW YORK.

HORSE-BOOT.

SPECIFICATION forming part of Letters Patent No. 776,334, dated November 29, 1904.

Application filed April 19, 1904. Serial No. 203,889. (No model.)

*To all whom it may concern:*

Be it known that I, LOUIS LACKNER, a citizen of the United States, residing in New York, borough of Brooklyn, in the State of New York, have invented certain new and useful Improvements in Horse-Boots, of which the following is a specification.

This invention relates to horse-boots, and has for one of its objects the provision of a boot which can be readily applied to or removed from the horse's hoof by an unskilled person and which obviates entirely the use of nails and the injury to the hoof caused thereby.

My improved horse-boots are of great convenience, particularly in rural districts, where a journey to a farrier's shop means much trouble and delay.

A further object of the present invention is to provide a boot which shall act as a remedy for cracked or sore hoofs by clamping the same in such a way as to prevent the continuance of the aforesaid conditions.

A further object of the invention is the provision of a boot having means for effectually preventing the slipping of the animal upon snow and ice covered streets and roads.

With these and other objects and advantages in view the invention consists of a horse-boot composed of three parts—two side parts and a front or toe part to which the side parts are pivoted, so as to be laterally adjustable, the rear ends of the side parts being provided with sockets connected by a transverse screw-bolt. The upper portion of each section is shaped so as to fit the hoof of the horse and is provided at its upper edge with inwardly-bent teeth that bite into the hoof and secure the shoe thereto. The lower sections or calks of each part are provided with inwardly-projecting flanges or webs and riveted to the webs of the upper parts, both the upper and lower portions of the three parts being made of suitable sheet-steel or other suitable metal.

The invention consists, further, of certain details of construction and combinations of parts, which will be fully described hereinafter and finally pointed out in the claims.

Figure 1:
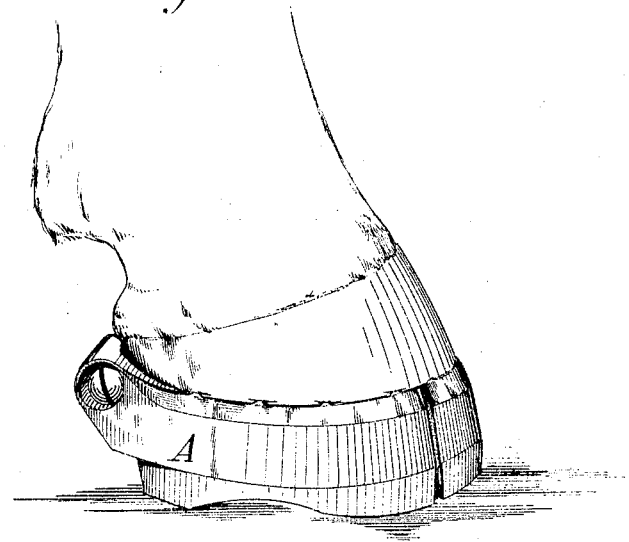
Figure 2:
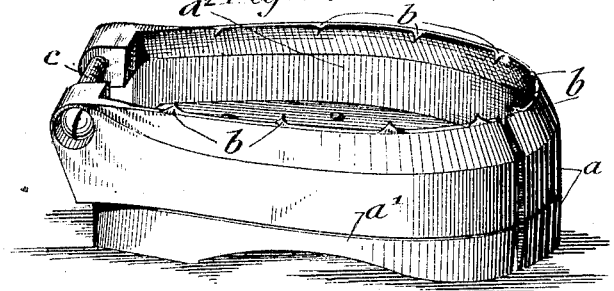
Figure 3:
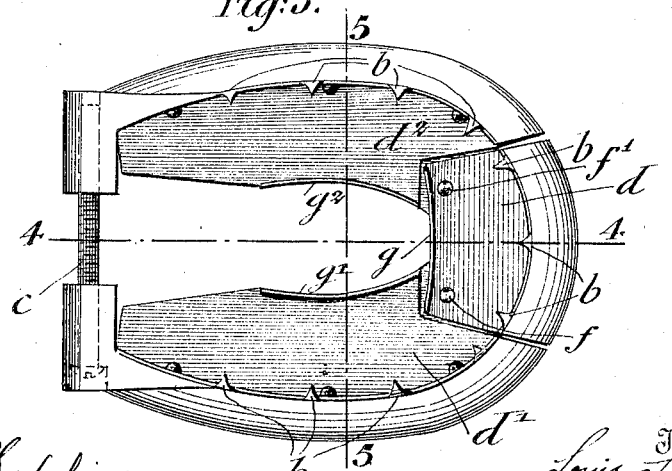

In the accompanying drawings, Figure 1 is a perspective view of a horse's hoof with my improved boot attached thereto. Fig. 2 is a perspective view of the boot detached from the hoof. Fig. 3 is a plan view of Fig. 2. Figs. 4 and 5 are respectively a vertical longitudinal section and a vertical transverse section on lines 4 4 and 5 5, Fig. 3; and Fig. 6 is a bottom view of the boot.

Similar letters of reference indicate corresponding parts.

Referring to the drawings, A designates my improved horse-boot, which is divided into three parts or sections $a$ $a'$ $a^2$, the longer side sections $a'$ $a^2$ being pivoted to the web of the central or toe section $a$. The upper edges of the toe and side sections are provided with inwardly-projecting teeth $b$, which serve for engaging the hoof of the horse, so as to retain the boot firmly thereon in connection with a transverse screw-bolt $c$, which is inserted into sockets at the upper rear ends of the side parts or sections $a'$ $a^2$, said screw-bolt being provided with a screw-head that is embedded in one socket, while the threaded shank of the screw engages the interiorly-threaded opposite socket of the part $a^2$, as shown in Figs. 2 and 3. The inwardly-projecting web $d$ of the front or toe portion $a$ is pivoted to the toe-section $a$ by means of pins P and is connected, by means of fastening members $f$ $f'$, with arc-shaped slots $e'$ $e'$ in the webs $d'$ $d^2$ of the side portions $a'$ $a^2$, so that the latter can be moved laterally on the web $d$ of the toe portion $a$, so as to fit different sizes of hoofs within certain limits. The connection between the sections $a$, $a'$, and $a^2$ made by the fastening-pins $f$ $f'$ and slots $e'$ $e'$ serves to greatly strengthen the boot and to reinforce the pivoted connection between the parts.

Along the inner edge of the webs of the side portions $a'$ $a^2$ are arranged upwardly-bent flanges $g'$ $g^2$, which engage the frog of the hoof. The web of the toe-section is likewise provided at its inner end with an arc-shaped flange $g$, which serves for the same purpose. Each section $a$ $a'$ $a^2$ is formed again of two parts, an upper boot portion $h$ and a lower calk portion $h'$. The boot portion is bent up from suitable sheet-steel or other suitable sheet metal by suitable dies, likewise the calk portions, the former being provided with inwardly-projecting front flanges and inwardly-bent projecting lugs $k$, by which the calk portions are riveted to the webs of the boot portion. The calk-section of section $a$ is provided with a plate $l$, which is securely riveted to the upper section, as shown in Fig. 6.

By the rivet connection between the webs of the upper portion and the lugs of the lower portion a rigid connection between the calk portions is obtained, so that the entire boot can be made of sheet-steel, which combines strength with the required degree of lightness, so as to fit over the shoe and hoof and exert not too great a weight on the same. The calk portion can be readily sharpened by filing away the edges, so as to securely engage ice-covered roads, &c., and prevent the horse from slipping. The calks may be provided with sharp edges or filed into individual calks, as desired, the form of calk shown in Figs. 1 and 2 showing merely the general idea of the sharpened edges of the calks. They can be resharpened from time to time until gradually used up, when a new calk is required. A set of four boots is required for each horse, which set can be readily applied in the winter season when ice covers the streets, the boot being easily applied to the hoof and connected thereto by tightening the screw-bolt connecting the rear ends of the side portions and driving thereby the boot firmly into the hoof. It is best to carry a set of boots for each horse in a canvas, leather, or other bag until required for use. The driver, whenever freezing weather sets in, can readily apply the boots to the horse's hoofs while on the road, and thereby protect the horse from slipping and danger.

The boots can be manufactured on a large scale by means of dies and can be supplied at a price within the reach of every owner of horses, the application of the boot requiring no special blacksmith-work and being applicable without the use of straps or other fastening devices of like nature.

Having thus described my invention, I claim as new and desire to secure by Letters Patent—

1. A horse-boot, comprising a toe-section and side sections, said sections having inwardly-extending webs, the side sections having slots in their webs, and said toe-section having fastening members secured to its web and slidable in said slots, and means for connecting said side sections at their rear ends for tightly securing the boot to the hoof.

2. A horse-boot, comprising a toe-section and side sections pivoted thereto, inwardly-extending webs on all of said sections, the webs of the side sections being provided with arcuate slots, pins secured to the web of the toe-section and slidable in said slots, and means for connecting the rear ends of the side sections for securing the boot to the hoof.

3. A horse-boot, comprising a toe-section and side sections pivoted thereto, all of said sections being provided with inwardly-extending webs and with upwardly-extending flanges at the inner edges of said webs, the flange on the toe-section web being disposed at approximately right angles to the flanges of the side-section webs, and means for securing the boot to the hoof.

4. A horse-boot, comprising a toe-section and side sections, the two side sections being pivoted to the toe-section, hoof-engaging teeth on the upper part of said sections, a screw connection at the rear ends of said side sections, each toe and side section being composed of a boot-section and a calk-section, inwardly-extending webs on said boot-sections, lugs on said calk-sections, and means for connecting the webs of the boot-sections and the lugs of the calk-sections.

In testimony that I claim the foregoing as my invention I have signed my name in presence of two subscribing witnesses.

LOUIS LACKNER.

Witnesses:
PAUL GOEPEL,
HENRY J. SUHRBIER.